United States Patent [19]

Stinson

[11] Patent Number: 4,668,008
[45] Date of Patent: May 26, 1987

[54] SLIDING DOOR TRAILER

[75] Inventor: Donald B. Stinson, Farmington, Mich.

[73] Assignee: Kelsey-Hayes Company, Romulus, Mich.

[21] Appl. No.: 760,024

[22] Filed: Jul. 29, 1985

Related U.S. Application Data

[63] Continuation of Ser. No. 564,536, Dec. 22, 1983, abandoned.

[51] Int. Cl.⁴ .................... B60T 5/06; B61D 17/08; C05D 15/10
[52] U.S. Cl. .................... 296/155; 296/181; 105/378; 49/219
[58] Field of Search .................... 296/181–183, 296/146, 155; 105/378; 49/125, 127, 128, 130, 218, 219, 220

[56] References Cited

U.S. PATENT DOCUMENTS

| | | | |
|---|---|---|---|
| 1,607,971 | 11/1926 | Turnbull et al. | 49/219 |
| 1,665,384 | 4/1928 | Viers et al. | 49/219 |
| 1,938,926 | 12/1933 | Newman | 49/219 |
| 4,048,755 | 9/1977 | Wolak et al. | 49/220 |

Primary Examiner—Robert B. Reeves
Assistant Examiner—Dennis H. Pedder
Attorney, Agent, or Firm—Ralph J. Skinkiss; David D. Murray; David L. Kuhn

[57] ABSTRACT

A trailer having a plurality of sliding side doors as well as conventional rear doors permits side access to the trailer interior, enhancing cargo loading and unloading speed and flexibility. At least one side of the trailer includes full length upper and lower tracks, each upper and lower track slidably receiving a set of trolleys which support and guide an individual door. The trolleys are coupled to the doors by pivoting arms which move between two positions. In the first, closed position, the door is in substantial vertical alignment with the tracks and may be latched to the trailer proper such that it functions as a portion of the sidewall; in the second, open position, the door is spaced laterally from the tracks and the other doors such that it may be slid along the full length of the trailer. The trailer also includes special hardware for facilitating securing the doors to the trailer body, slidably opening them, flexibly sealing adjacent doors and removing door weight from the trolleys and tracks when they are closed.

1 Claim, 21 Drawing Figures

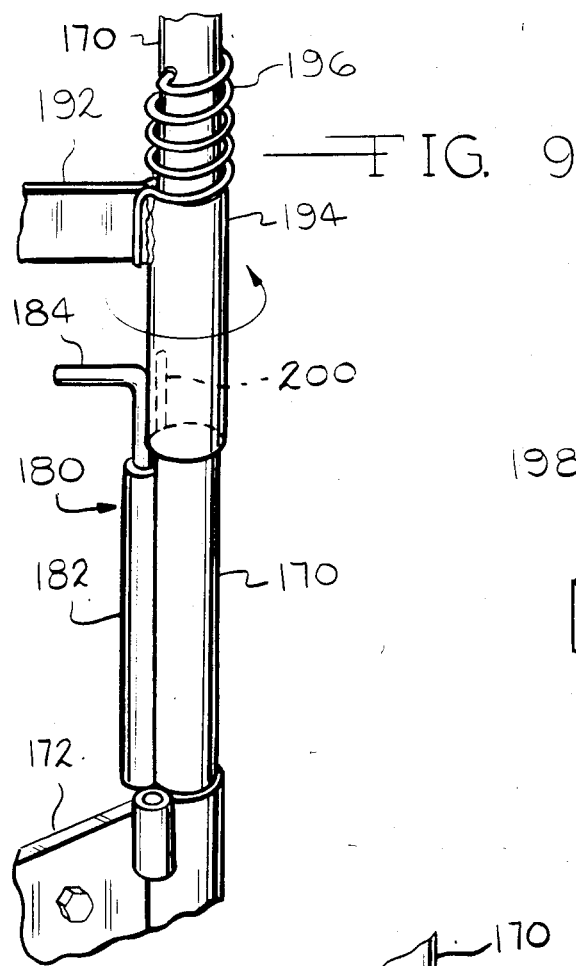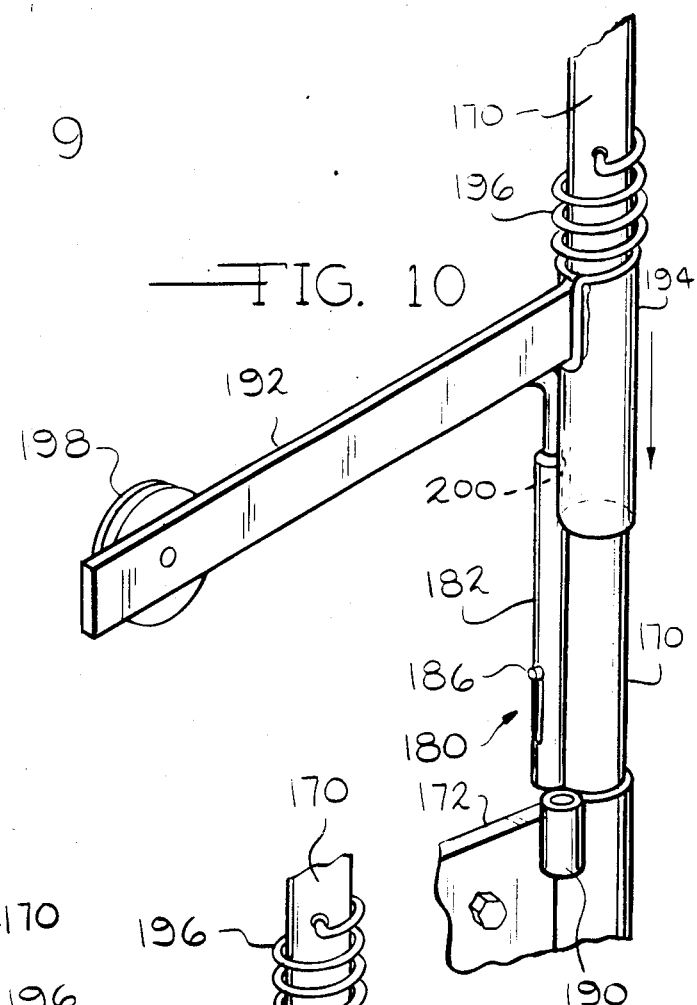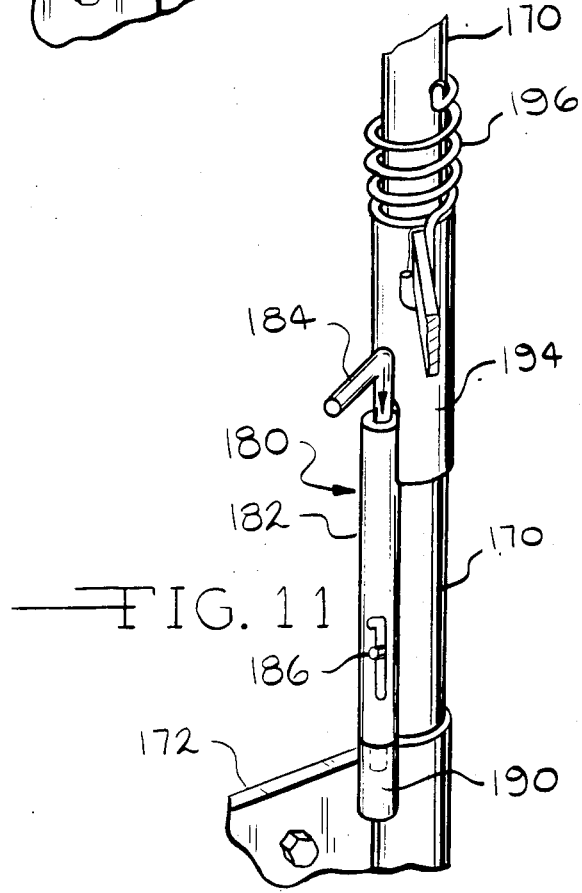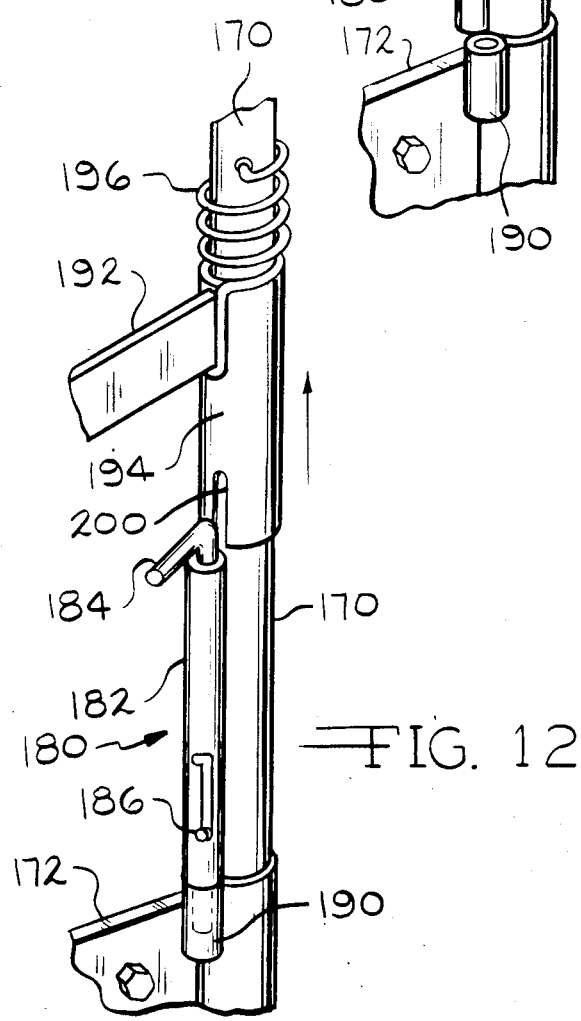

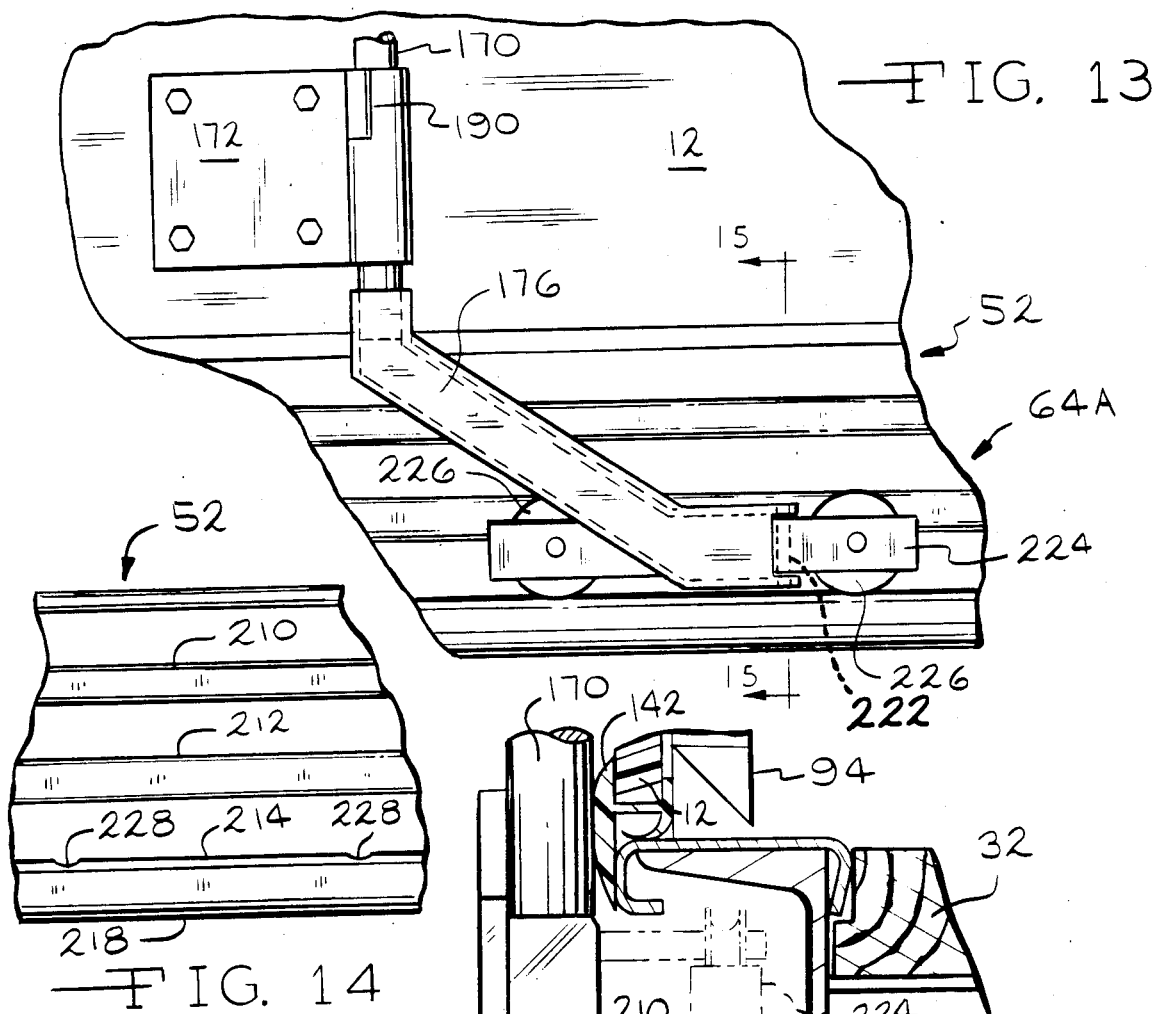
FIG. 13
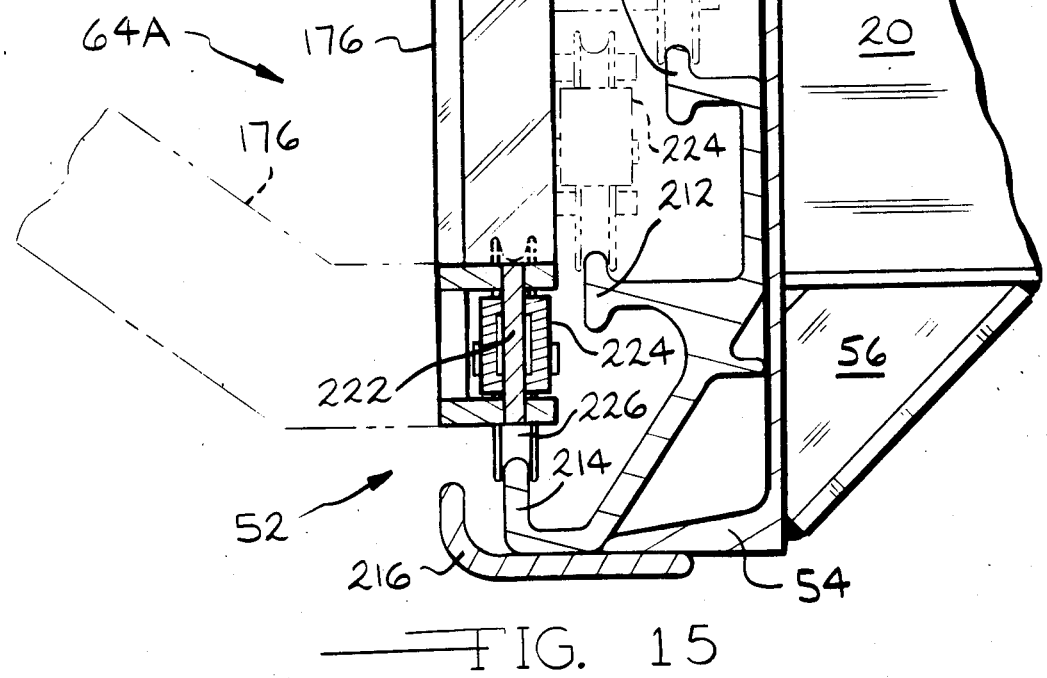
FIG. 14
FIG. 15

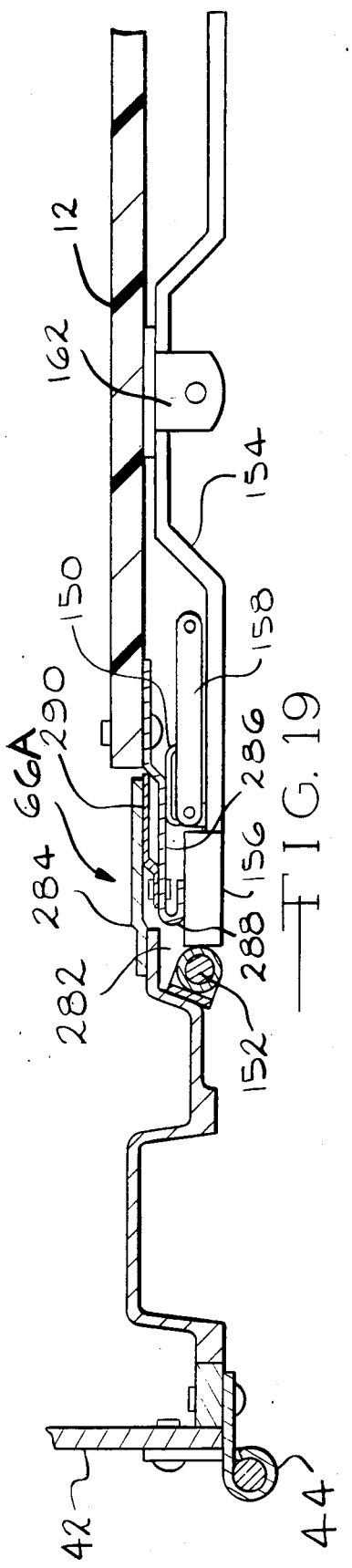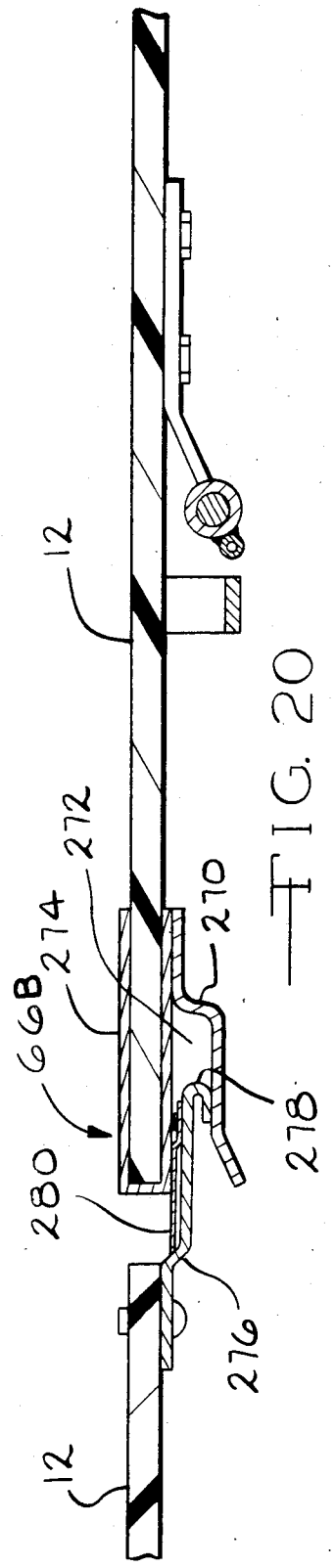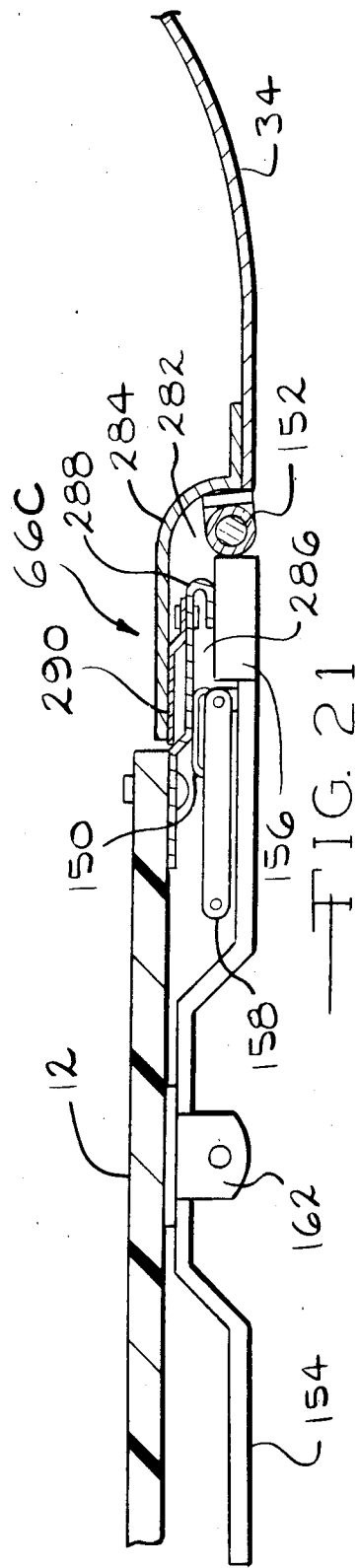

SLIDING DOOR TRAILER

This is a continuation of U.S. application Ser. No. 564,536, filed Dec. 22, 1983, now abandoned.

BACKGROUND OF THE INVENTION

The invention relates generally to enclosed, cargo transporting trailers and more specifically to such a trailer having at least two sliding side panels which function as doors to permit access to the trailer from the side.

A conventional cargo trailer, the workhorse of the transportation industry, can be accurately and simply described as an elongate, wheeled container having a width of approximately 8 feet, an interior height of between 8 and 10 feet and a length between 30 and 50 feet. The top, sidewalls and bottom of the trailer will typically be rigid panels and access to the interior is generally provided by a pair of hinged, rear doors. While this straightforward design has well served the needs of the transportation industry and those dependent thereon, certain disadvantages are inherent in this design.

First of all, it is readily apparent that cargo disposed in an elongate trailer wherein interior access is available only through one end must be loaded and unloaded sequentially. Two consequences devolve from this difficulty. Since the cargo must be loaded in a sequential fashion, the load/unload time clearly is greater than that which would be experienced if access to a greater portion of the trailer could be obtained at one time, thereby facilitating unloading of greater portions of cargo at one time or through simultaneous utilization of plural unloading agencies such as plural lift trucks. Furthermore, if the cargo consists of disparate articles, it may be necessary to take care to load the trailer in the inverse order in which such disparate cargo will be utilized. If this is not done, it may be necessary to unload substantially the entire cargo before certain first-needed cargo can be retrieved from the trailer. Such a situation has obvious time loss consequences which generally can be overcome only by involving the shipping entity with the material handling requirements of the receiver. Such involvement places a premium on communication and an undue burden on the shipper.

A second difficulty of end loading trailers also relates to the loading/unloading procedure, creates delays and increases the overall time spent in this activity. This difficulty relates to the handling and return of empty parts baskets, empty pallets or other empty cargo carrying devices. Since none of the empty cargo carriers can be returned to the trailer at the cargo utilization site until all of the filled cargo carriers have been removed, numerous additional movements of transport vehicles such as forklifts and additional engagements/disengagements of the carriers by such forklifts are necessitated. For example, a bin or basket may be removed from a trailer, transported to a utilization site in a manufacturing facility where a similar empty bin or basket may be engaged and returned to the loading dock. Until the trailer has been fully emptied, however, the carrier cannot be placed within the trailer. This problem can be brought into sharp relief by envisioning a trailer design and system whereby cargo carriers can be removed from the trailer and transported to their utilization site while empty carriers are returned to the trailer and placed in the space just vacated.

Recent, significant shifts in production methods, inventory techniques and management theories are directed toward the reduction of manufacturing site inventory, compensated for by rapid and timely delivery of components by vendors heretofore warehoused by the user. Such manufacturing and inventory control schemes emphasize, and in fact require, rapid movement of material transported on commercial trailers which is assisted by timely loading and unloading. Side loading trailers further facilitate handling of material of great length such as lumber, pipe and similar elongate goods.

Side loading trailers are known in the prior art. For example, U.S. Pat. No. 4,302,044 discloses a trailer body having slidably openable side panels as well as hinged top panels to provide access to the interior of the trailer in addition to that provided by conventional hinged rear doors. U.S. Pat. No. 3,815,518 discloses a railroad freight car having three side doors in which the middle door may be swung away from the vertical plane of the end doors to facilitate side loading of the car. A review of the foregoing patents and other prior art reveals certain difficulties in designs relating to, for example, the complexity and operational difficulty thereof. It is thus apparent that improvements in the designs of side loading trailers are both possible and desirable.

SUMMARY OF THE INVENTION

A trailer according to the instant invention includes at least two sliding door-walls which comprise substantially one side of a cargo trailer and which slide longitudinally along the trailer to expose a fraction of the trailer side in inverse proportion to the number of doors. At least one side of the trailer includes such sliding doors while conventional hinged doors are disposed at the rear of the trailer. A pair of vertically aligned tracks generally adjacent the top and floor of the trailer extend substahtially the full length of the trailer and include a plurality of individual rails equal in number to the number of sliding side doors. A plurality of trolleys are received on and slide along the rails. The trolleys support the sliding doors which are coupled thereto by pivot arm assemblies. The arm assemblies move between a first, closed position wherein the doors are generally aligned longitudinally in a common plane and secured to the trailer and a second position wherein each door is disposed at a fixed, unique distance from the trailer proper such that each door may be translated the entire length of the trailer and pass freely by any of the other doors. Each of the doors includes independently operable mechanisms for pivoting the arms between their first and second positions; a locking mechanism having a plurality of door to trailer frame latches for positively securing the door to the trailer; cooperating ramp and lider assemblies for lifting the door as it is moved into its secure position in the trailer to remove weight from the trolley assemblies; opening arm assemblies for positioning the doors in and moving them between a sealed position and a movable position; and sealing assemblies which facilitate flexible interconnection between doors and trailer structure.

It is thus an object of the instant invention to provide a trailer wherein access is provided to the interior through at least one side having at least a pair of longitudinally slidable doors.

A further object of the instant invention is to provide a trailer wherein access is provided to the interior through at least one side having at least a pair of longitudinally slidable doors and a pair of conventional, hinged rear doors.

It is a further object of the instant invention to provide a trailer wherein each longitudinally translating side door panel may be independently moved the entire length of the trailer.

Further objects and advantages of the instant invention will become apparent by reference to the following description of the preferred embodiment and appended drawings.

BRIEF DESCRIPTION OF THE DRAWINGS

FIGS. 9, 10, 11 and 12 illustrate various operational positions of the door pivot assembly which positions the door in a first, secure position or second position laterally spaced from the trailer;

FIG. 13 is a fragmentary, elevational view of one of the lower trolley assemblies associated with the forward door;

FIG. 14 is a fragmentary, elevational view of the lower track assembly;

FIG. 15 is a fragmentary, sectional view of the trolley assembly illustrated in FIG. 13, taken along line 15—15 of FIG. 13;

FIG. 19 is a fragmentary, sectional view of the seal assembly between the end structure of the trailer and rear door taken along line 19—19 of FIG. 1;

FIG. 20 is a sectional, fragmentary view of the seal assembly between the middle and forward doors of a trailer according to the instant invention taken along line 20—20 of FIG. 1; and FIG. 21 is a fragmentary, sectional view of the seal assembly between the forward door and the forward region of the trailer, taken along line 21—21 of FIG. 1.

DESCRIPTION OF THE PREFERRED EMBODIMENT

Figure 1:
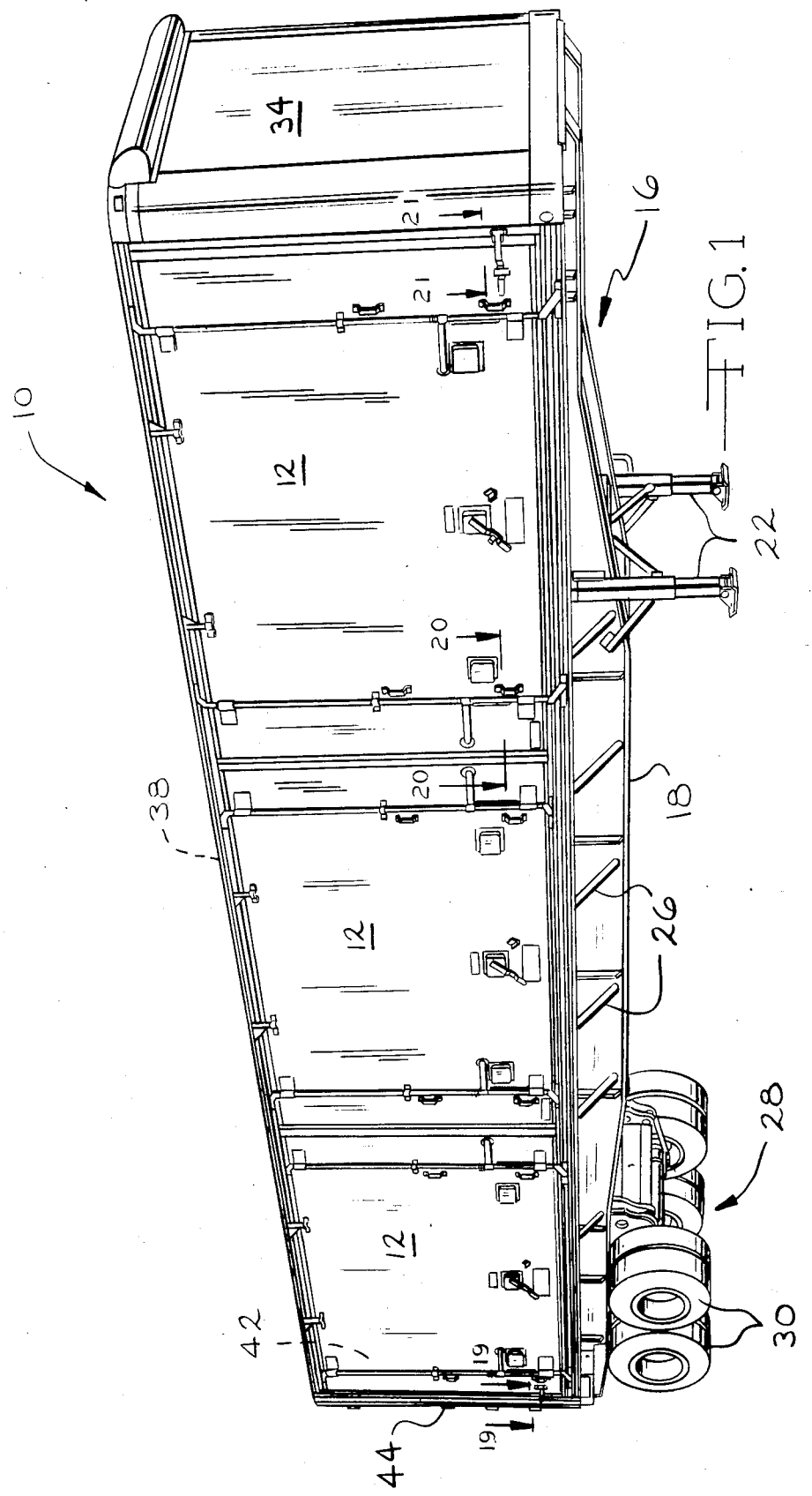
FIG. 1 is a perspective view of a trailer according to the instant invention.
Figure 2:
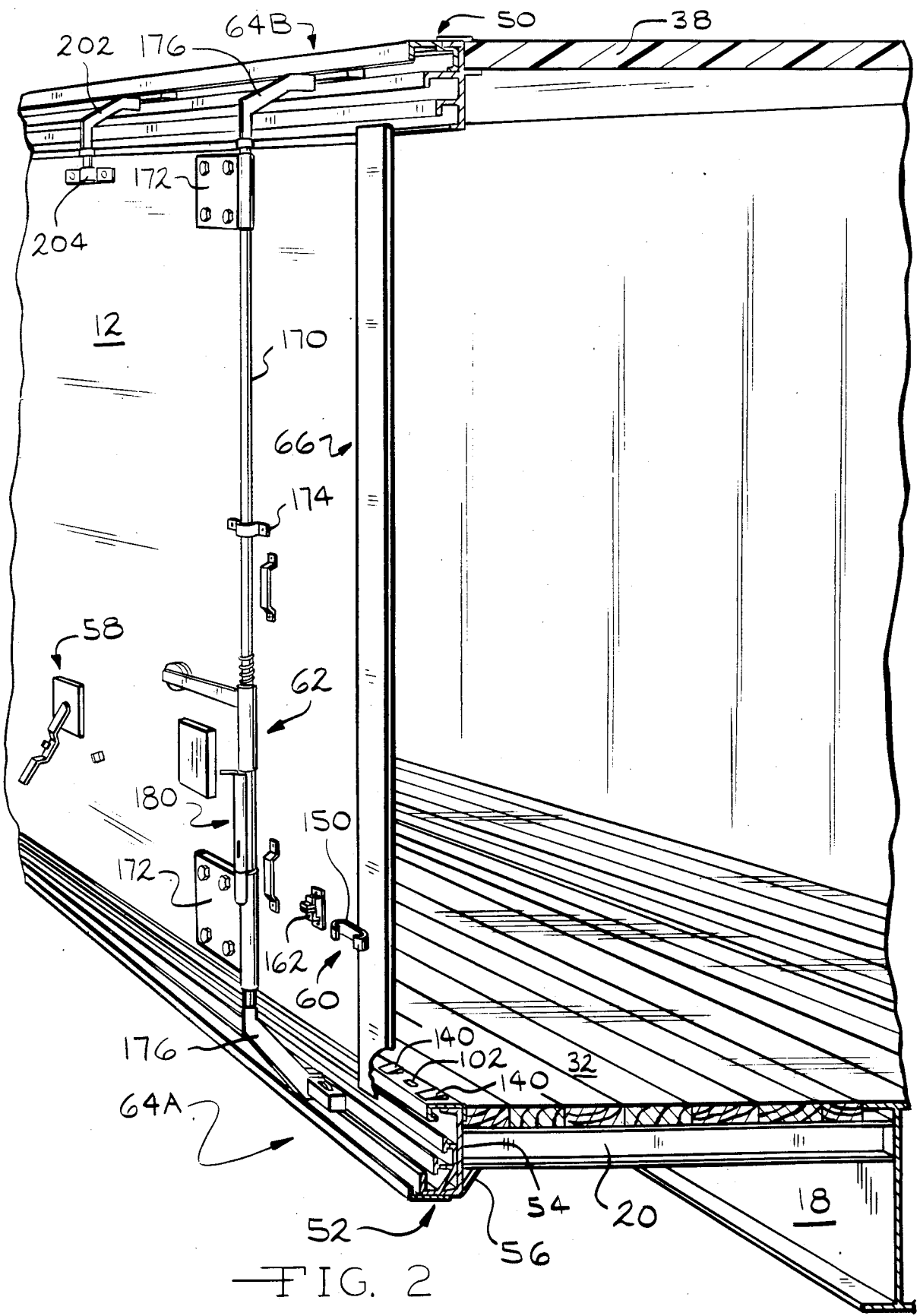
FIG. 2 is a fragmentary, perspective view of one of the sliding doors of a trailer according to the instant invention in an open position.

Referring now to FIGS. 1 and 2, a sliding door trailer according to the instant invention is illustrated and generally designated by the reference numeral 10. Disposed along at least one side of the trailer 10, in aligned, co-planar manner are a plurality of sliding doors 12.

The doors 12 are longitudinally translatable along substantially the full length of the trailer 10 thus providing access to the interior of the trailer 10 as well as functioning to close off the side of the trailer 10 as do conventional, fixed walls. The sliding doors 12 might therefore be more aptly designated slidable wall panels but, for reasons of brevity, they will be designated simply as doors 12. It should also be understood that while the following description and appended drawings will relate to and describe sliding doors 12 disposed on but one side of the trailer 10, it should be apparent that such doors and their associated hardware are wholly adaptable for use on both sides of a trailer 10 and that a trailer thus incorporating sliding doors 12 on both sides is hereby considered an inherent and obvious variation of the instant invention. The trailer 10 illustrated in FIG. 1 includes three sliding doors 12, each of the doors 12 preferably occupying one-third of the length of the trailer 10. Such a door configuration provides a maximum open sidewall region equal to approximately two-thirds of the length of the trailer 10. It should be understood that variations in the number of sliding doors 12 may be utilized and are hereby considered to be an inherent feature of the instant disclosed invention. The utilization of but two sliding doors 12 reduces access to the side of the trailer 10 to approximately one-half its length whereas additional doors, for example, four or five, increase access to the trailer 10 to three-fourths and four-fifths of its length, respectively. The use of four, five and greater numbers of the sliding doors 12, however, requires corresponding increases in several assemblies of the trailer 10 as will become apparent by subsequent explanation.

The trailer 10 includes an elongate frame assembly 16 which includes a pair of parallel, elongate I-beams 18 to which are secured a plurality of crossbeams 20, a pair of landing gear 22 and a kingpin (not illustrated) at the forward portion of the trailer 10. Disposed in spaced-apart relationship along the length of the trailer 10 are a plurality of obliquely oriented braces 26 which extend between the I-beams 18 and crossbeams 20. At the rearward portion of the trailer 10 and secured to the I-beams 18 is an axle assembly 28 which includes suspension and braking components (not illustrated) and rotatably supports a plurality of wheels and tires 30. The floor of the trailer comprises a plurality of elongate parallel wood planks 32 which are secured to the crossbeams 20 by suitable fasteners (not illustrated). The trailer floor, alternatively, may be fabricated of metallic or wood composition sheets or plates, if desired. A front wall 34 extends upwardly from the forward termini of the I-beams 18. A roof 38 extends to the rear from the front wall 34 and may be of any conventional and suitable construction. At the rear of the trailer 10, a pair of conventional rear doors 42, one of which is illustrated in FIG. 19, each extends one-half the width of the trailer 10 and is pivoted along their outer vertical edges at hinges 44. The rear doors 42 provide access to the interior of the trailer 10 in a conventional manner.

Disposed adjacent the roof 38 and extending preferably the full length of the trailer 10 is an upper track assembly 50. The upper track assembly 50 is secured to the roof 38 and is supported thereby. Disposed in vertical alignment with and longitudinally co-extensive with the upper track assembly 50 is a lower track assembly 52. The lower track assembly 52 is secured by suitable fasteners to a channel beam 54 which extends about the periphery of the trailer 10 and which is in turn secured to the crossbeams 20. The channel beam 54 may be reinforced by a plurality of gussets 56 which are associated with each of the crossbeams 20. Each of the sliding doors 12 includes independently operable mechanisms for effecting latching, opening, pivoting, and sliding of the doors 12. A portion of the latch assembly 58 is illustrated in FIG. 2 as are portions of the opening assembly 60. A pivot assembly 62, trolley assemblies 64A and 64B, and a portion of a seal assembly 66 are also illustrated. These various assemblies will be described below, commencing with the latch assembly 58.

Figure 3:
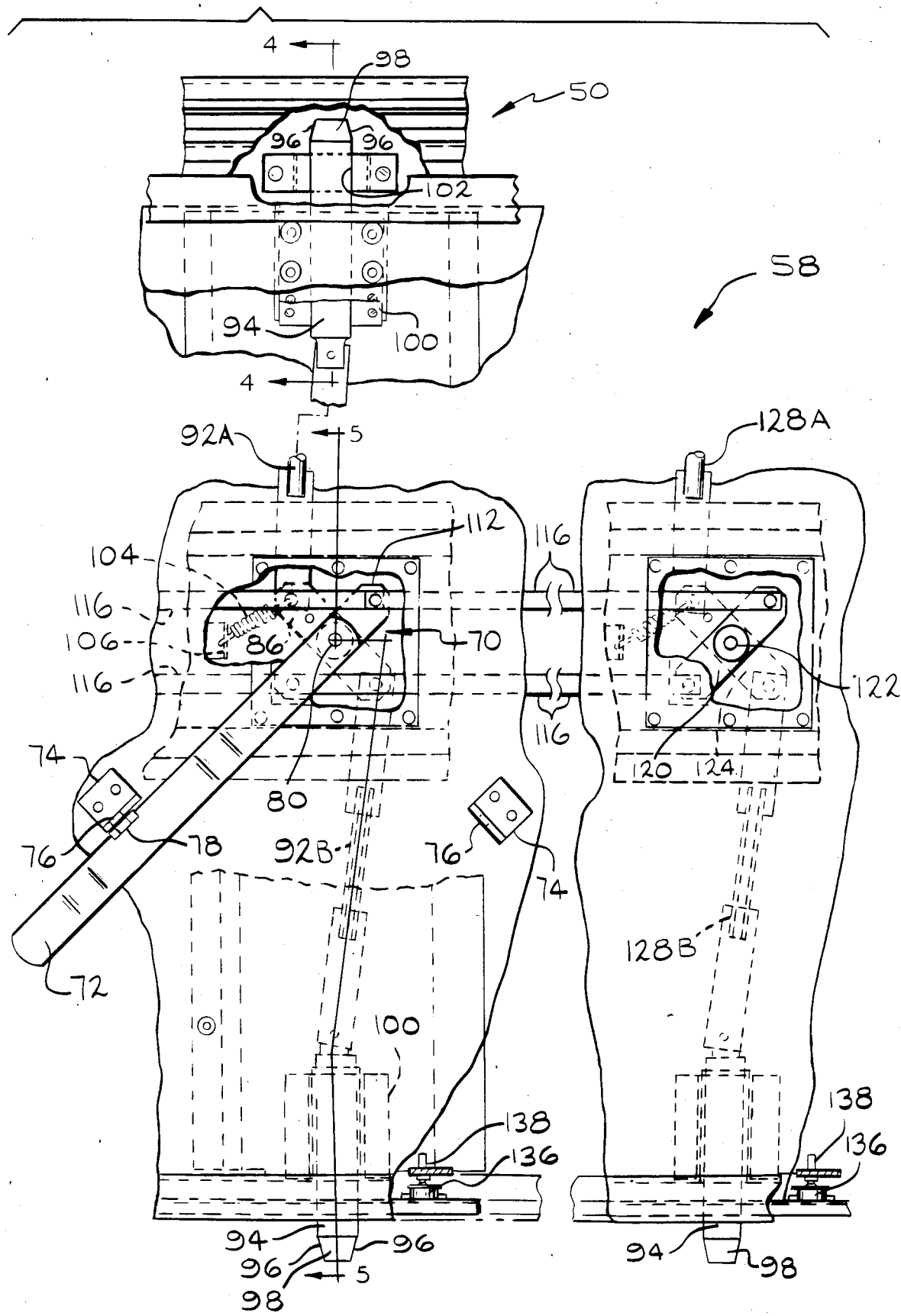
FIG. 3 is a diagrammatic, side elevational view of the door latch assembly according to the instant invention.
Figure 4:
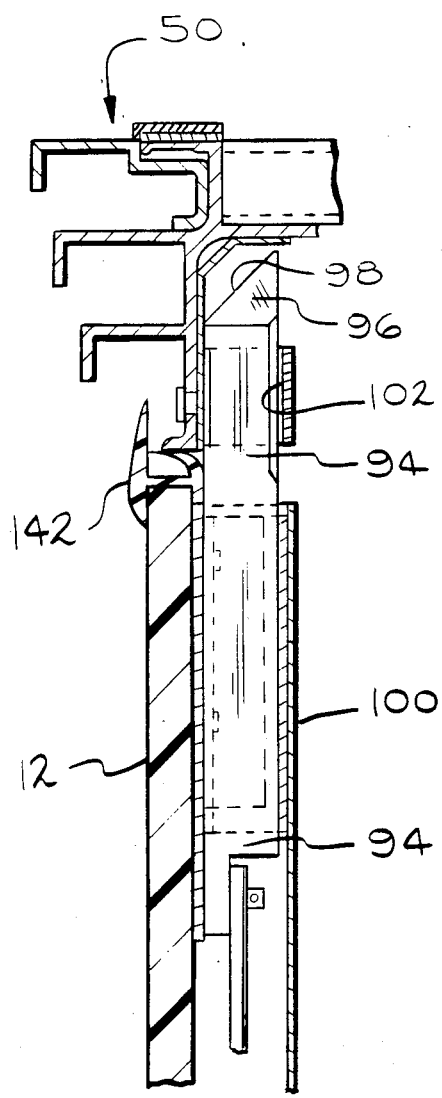
FIG. 4 is an enlarged, fragmentary sectional view of an upper door latch mechanism according to the instant invention taken along line 4—4 of FIG. 3.
Figure 5:
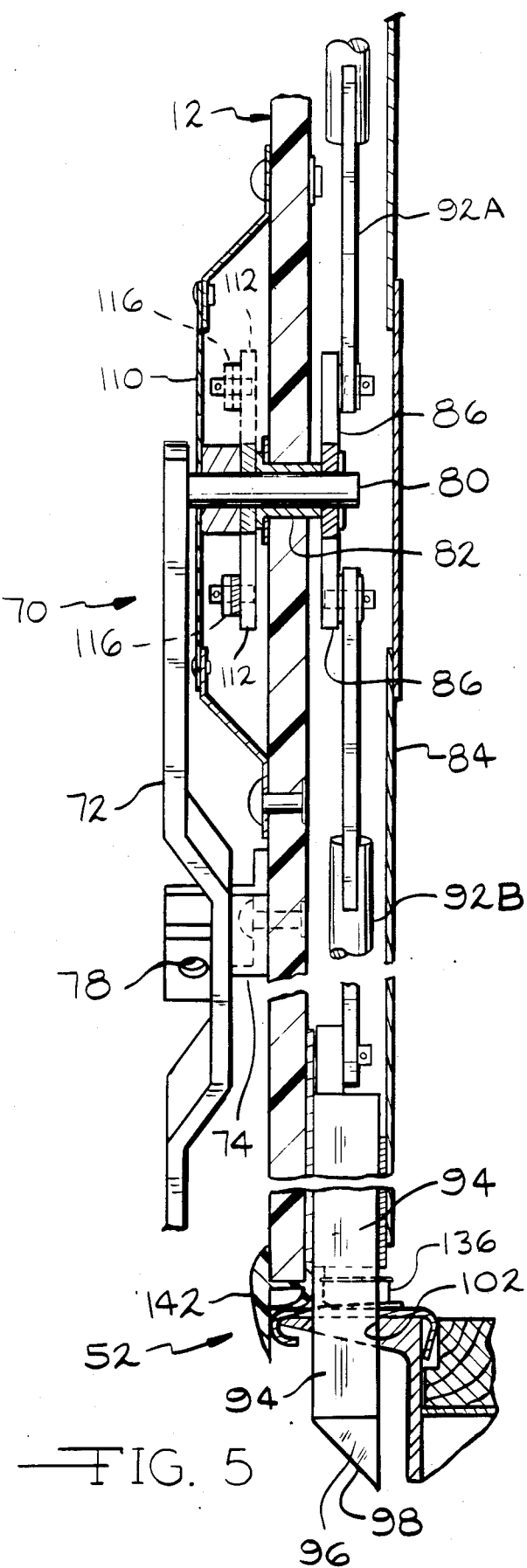
FIG. 5 is an enlarged, fragmentary sectional view of the crank arm and lower latch mechanism of a door latch assembly according to the instant invention taken along line 5—5 of FIG. 3.

Referring now to FIGS. 3, 4 and 5, it will be appreciated that the latch assembly 58 which is associated with each of the sliding doors 12 generally includes a plurality of latch mechanisms which are operated positively and in unison to secure the sliding doors 12 to the trailer 10 proper. Mounted within each of the sliding doors 12 is a central operator assembly 70 which includes an actuator crank 72 movable from the outside of the trailer 10 through an arc of approximately 90°. Motion of the actuator crank 72 may be limited by a pair of opposed stops 74 which may take the form of tabs or ears. The stop 74 disposed adjacent the actuator crank 72 in its closed position, illustrated in FIG. 3, may include an aperture 76 which aligns with a complementary aperture 78 on the actuator crank 72 to permit the attachment of locks or security seals therethrough. The actuator crank 72 is affixed to, supported by and rotates a stub shaft 80. The stub shaft 80 is rotatably received within a suitable bushing 82 secured to the door 12. Secured to the stub shaft 80 generally between the door 12 and an inner protective panel 84 is a first double drive crank 86. Pivotally secured to the double drive crank 86, adjacent its ends, are a pair of actuating linkages 92A and 92B. The linkage 92A extends upwardly from the upper end of the crank 86 and the linkage 92B extends downwardly from the lower end of the crank 86. The upper end of the upper actuating linkage 92A and lower end of the lower actuating linkage 92B are pivotally secured to vertically translatable latch members 94. Each of the latch members 94 includes a tapered terminal portion 96 having an outwardly facing, obliquely oriented surface 98 disposed at an angle of approximately 45°. The latch members 94 are received within suitably configured mounting brackets 100 which restrain the latch members 94 against all motion except bi-directional motion along the vertical axis.

Referring now to FIGS. 2, 3 and 4, the latch members 94 are received within suitably disposed sockets 102 disposed at appropriately spaced intervals along the upper track assembly 50 and the lower track assembly 52. Examination of FIG. 3 reveals that counterclockwise motion of the actuator crank 72 from the position illustrated in FIG. 3 through an arc of approximately 90° will cause corresponding rotation of the double drive crank 86 causing downward motion of the upper linkage 92A and upward motion of the lower linkage 92B thereby retracting the latch members 94. A tension spring 104 may be secured between one end of the crank 86 and a suitable bracket 106 on the door 12 to assist movement of the actuator crank 72, if desired.

Disposed generally on the outer face of the door 12 and beneath a cover plate 110 is a second double drive crank 112 which is also secured to the stub shaft 80. Pivotally secured to the second double drive crank 112, adjacent its ends, are a pair of horizontally disposed transfer linkages 116. The transfer linkages 116 may take the form of rods, bars or other suitably rigid, force transmitting members and extend both to the front and rear (to the left and right) from the central operator assembly 70 illustrated in FIG. 3. Each termini of the linkages 116 remote from the second double drive crank 112 are similarly pivotally secured to double drive cranks 120, one of which is illustrated in FIG. 3. The double driven crank 120 is rotatably disposed about an axis parallel to the axis of the stub shaft 80 on another stub shaft 122. Disposed generally at right angles to the double driven crank 120 is another double drive crank 124. Pivotally secured to the double drive crank 124, adjacent its ends, are a pair of linkages 128A and 128B. The upper linkage 128A extends upwardly from the upper end of the drive crank 124 and the lower linkage 128B extends downwardly from the lower end of the drive crank 124. The termini of the linkages 128A and 128B are pivotally secured to latch members 94 which are in all respects identical to the latch members 94 described above. It can thus be appreciated that rotation of the actuator crank 72 in the counterclockwise direction will thus cause counterclockwise rotation of the double cranks 120 and 124 about the axis of the shaft 122, thereby causing downward movement of the upper linkage 128A, upward movement of the lower linkage 128B and retraction of the associated latch members 94. It should be understood that the upper portion of the forward latch mechanism and both the upper and lower portions of the rearward latch mechanism, which are not illustrated in FIG. 3, are in all respects identical to the latch mechanisms illustrated therein. It will thus be appreciated that each sliding door 12 preferably includes six latch members 94, interconnected and operated in unison.

With reference now to FIGS. 2, 3, 4, and 5, it will be seen that disposed on both sides of each of the lower latch members 94 is a slide button 136. The slide button 136 may be vertically adjustable by means of a simple threaded adjustment mechanism 138 if desired. Disposed in aligned relationship with each of the slide buttons 136 on both sides of each of the sockets 102 and secured to the lower track assembly 52 is a ramp pad 140. As the sliding doors 12 are wedged inwardly by the action of the latch members 94, and particularly by the obliquely oriented surfaces 98, the slide buttons 136 translate up the ramp pads 140 thereby lifting the sliding door 12 and removing its weight from the pivot assembly 62, the lower trolley assembly 64A and the lower track assembly 52. Full length weather seals 142 extend along each of the sliding doors 12 and engage suitably disposed surfaces on the upper track assembly 50 and lower track assembly 52 when the sliding door 12 is in its closed position. It will thus be appreciated that in their closed positions, the sliding doors 12 are sealed and tightly secured to the trailer 10 and function as integral, structural body components of the trailer 10.

Figure 6:
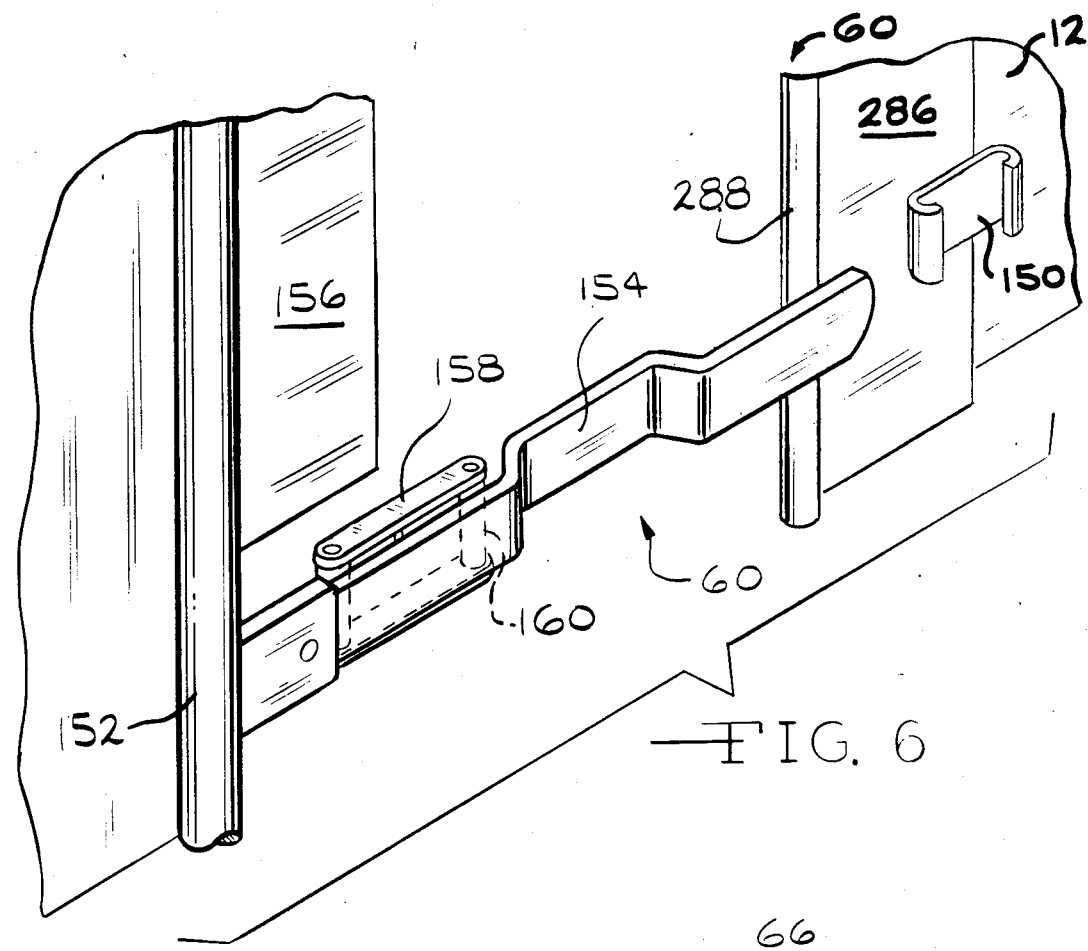
FIGS. 6, 7 and 8 illustrate various operational positions of the door opening assembly which facilitates initial longitudinal opening and closing of the doors.
Figure 7:
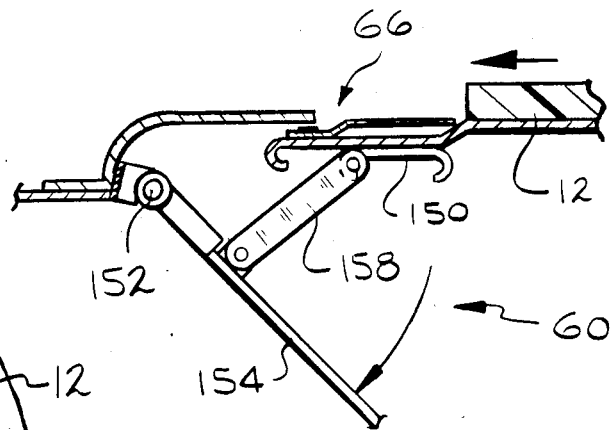

With reference now to FIGS. 1, 2, 6, 7, 8, 19 and 21, the opening assembly 60 associated with the forward and aft sliding doors 12 will now be described. Due to friction associated with the seal assemblies 66 to be described subsequently, initial opening of the forward and aft sliding doors 12, requires a certain effort and is facilitated by the opening assembly 60. It will be appreciated that the forward opening assembly 60 associated with the forward sliding door 12 and the aft opening assembly 60 associated with the aft sliding door 12 are similar though reversed in sense and that the description following refers to and contemporaneously explains both of the assemblies 60. Generally vertically aligned with each of the seal assemblies 66 is an opposed, double C-shaped bracket 150 which is secured to the outside of the sliding door 12. Horizontally aligned with the bracket 150 and attached to a vertically oriented pivot rod 152 secured the door 12 to rotate about its own axis is a lever arm 154. Also secured to the pivot rod 152 is a vertically oriented weather seal plate 156 which cooperates with the seal assembly 66 as will be more fully described subsequently. Pivotally secured to the lever arm 154, a short radial distance from the pivot rod 152, is a link member 158. The link member includes a vertically oriented pin 160 which may be positioned to engage either one of the internal recesses defined by the double C-shaped bracket 150. A two piece bracket 162 having components positionable to receive the lever arm 154 and securable together by use of locks or seals (not illustrated) is preferably secured to the side of the sliding door 12 in horizontal alignment with the lever arm 154. To utilize the opening assembly 60, the sliding door 12 is first unlatched according to the previous description. To open the forward door 12, lever arm 154 is first swung clockwise away from the forward door 12 as seen in FIG. 7. Link member 158 is engaged in C-shaped bracket 150 so that vertical pin 160 of link member 158 engages the forward semi-circular recess of bracket 150. Lever arm 154 then continues to be swung in the clockwise direction so that the forward door 12 is pushed forward toward the front edge of the door opening. Link member 158 is disengaged from bracket 150 and lever arm 154 is pivoted further clockwise to rotate seal plate 156 on rod 152 away from the forward door 12. The forward edge of the forward door 12 is pulled outboard from trailer 10 to clear the doorway. The rearward edge of the forward door 12 is still in partial tongue and groove engagement with the middle door 12, but the tongue and groove engagement flexes enough to allow the outboard movement of the front edge of the forward door 12. The forward door 12 is then rolled forward thereby disengaging from the middle door 12.

To close the forward door 12, it is slid backward into tongue and groove engagement with the middle door 12 and the forward edge of the forward door 12 is moved inboard. Link member 158 of lever arm 154 is engaged with the rearward semi-circular recess of bracket 150. Lever 154 is rotated in a counterclockwise direction as seen in FIG. 7 to push the forward door 12 further backward into engagement with the middle door 12. After link member 158 is disengaged from bracket 150, lever arm is rotated further clockwise to close seal plate 156 over the front edge of the front door 12.

The opening and closing of the aft door 12 is similar to that of the forward door 12. The middle door 12 is opened and closed simply by moving it outboard and inboard with respect to the trailer. Since the forward end aft doors 12 are translated away from the middle door 12 before it is opened or closed, the forward and aft doors 12 do not interfere with the opening or closing of the middle door 12.

Referring now to FIGS. 2, 9, 10, 11, 12 and 13, the pivot assembly 62 and its operation will now be described. Generally speaking, each of the sliding doors 12 includes a pair of vertically oriented, spaced-apart pivot assemblies 62, such pairs being similar on each of the sliding doors 12 with the exception that certain of the assemblies 62 are right-hand in sense whereas others are left-hand, as illustrated in FIG. 1. Inasmuch as all of the assemblies 62 include the same components and operate in substantially the same manner, only one of said assemblies 62 will be described; it being assumed that those skilled in the art will readily appreciate and understand those minor differences referred to above. Each of the pivot assemblies 62 includes a vertically oriented operator rod 170. The operator rod 170 is rotatably received within suitable positioning and mounting structures such as two mounting plates 172 and an intermediately disposed clamp 174. At both the lower and upper termini of the operator rod 170 is secured a pivot arm 176 which is in turn pivotally secured to a component of the trolley assemblies 64A and 64B, respectively, disposed in the respective lower track assembly 52 or upper track assembly 50. The trolley assemblies 64A and 64B will be described subsequently. Secured to the lower portion of the operator rod 170, generally above the lower of the mounting plates 172, is a locking assembly 180. The locking assembly 180 comprises an elongate tube 182 secured to the side of the operator rod 170 by welding or other suitable fastening means and which is disposed along an axis parallel to and spaced from the axis of the operator rod 170. The tube 182 defines a through bore within which is disposed a plunger 184 which may be downwardly spring-biased. A channel 186 having an upper detent is formed in the elongate tube 182 and effects constraint of the movement of the plunger 184 by virtue of cooperation between it and a radially disposed retaining pin 186. A socket 190 adapted to receive the plunger 184 of the locking assembly 180 is secured to the lower mounting plate 172 along an axis parallel to the operator rod 170 and spaced from said axis a distance equal to the spacing of the axis of the plunger rod 184 from said axis.

The pivot assembly 62 also includes an operator arm 192 which is secured to a rotatable and axially slidable collar 194 disposed about the operator rod 170. A torsion spring 196 having one end secured to the arm 192 and the other end secured to the operator rod 170 provides rotational bias to the arm 192 to urge it against the sliding door 12. At the end of the operator arm 192, a permanent magnet 198 or other suitable readily securable and releasable means may be utilized to positively position the operator arm 192 parallel to the sliding door 12 as illustrated in FIG. 2 during movement of the trailer 10. The collar 194 includes an elongate, open-ended slot 200 which may be positioned to engage the upper portion of the elongate tube 182 of the assembly 180. As shown in FIGS. 1 and 2, a pair of slave pivot arms 202 may be pivotally secured at one end to the upper portions of each of the sliding doors 12. The other end of each of the pivot arms 202 is pivotally secured to an upper trolley assembly 64B, to be described subsequently.

Operation of the pivot assemblies 62 is straight-forward. Assuming the unlatching and opening of the sliding doors 12 has been accomplished according to the previously described steps, the operator arm 192 may be pivoted such that the open-ended slot 200 engages the elongate tube 182. This motion is generally illustrated in FIG. 9. When the open-ended slot 200 has engaged the elongate tube 182 as illustrated in FIG. 10, the operator arm 192 may be further rotated and with it, the operator rod 170. Rotation of the operator rod 170 likewise rotates the pivot arms 176 and the slave pivot arms 202, translating the sliding door 12 away from the upper and lower track assemblies 50 and 52, respectively, and away from the trailer 10. When the sliding door 12 has reached its respective limit of transverse movement, the elongate tube 182 will be aligned with the socket 190 such that the plunger 184 may be engaged therein, maintaining the rotational position of the operator rod 170 and thus locking the sliding doors 12 in their transversely translated positions. Finally, the operator arm 192 and its associated collar 194 are returned to their stored position, parallel to the sliding door 12. This is accomplished expeditiously by upward motion of the operator arm 192 such that the open-ended slot 200 disengages the tube 182, thereby permitting rotation of the operator arm 192 and the collar 194 under the influence of the torsion spring 196 to the position generally illustrated in FIG. 2, parallel to the sliding door 12. Return of the sliding doors 12 to the transversely closed position is accomplished by following the above delineated steps in the reverse order.

With reference to FIGS. 2, 13, 14 and 15, the lower track assembly 52 and one of the lower trolley assemblies 64A will now be described. The lower track assembly 52 generally defines an elongate extrusion having plural rails which are equal in number to the number of sliding doors 12. Thus in the instant disclosed configuration, the lower track assembly 52 includes a first, upper rail 210, a second, middle rail 212 and a third, lower rail 214. Each of the rails 210, 212 and 214 is dedicated to and utilized by the lower trolley assemblies 64A associated with one of the sliding doors 12. Reference to FIG. 1 clarifies the fact that the first rail 210 is associated with and supports the lower trolley assemblies 64A of the middle sliding door 12, the second, middle rail 212 is associated with and supports the lower trolley assemblies 64A associated with the aft sliding door 12 and the third, lower rail 214 is associated with and supports the lower trolley assemblies 64A of the forward sliding door 12. A guard rail 216 secured generally to the lower track assembly 52 and the channel beam 54 protects the rails, particularly the lower rail 214, from inadvertent damage.

Each of the lower trolley assemblies 64A is secured to one of the pivot arms 176 and retained there by a vertically oriented pivot pin 222. The pivot pin 222 is securely retained within an elongate carriage 224 which is generally disposed directly above one of the rails 210, 212 or 214. Illustrated in FIG. 15, in phantom lines, is one of the carriages 224 associated with the middle sliding door 12 disposed on the upper rail 210 and one of the carriages 224 associated with the aft sliding door 12 disposed on the second, middle rail 212. Within the carriage 224 are secured a pair of rollers 226 which engage the lower rail 214. It will thus be appreciated that the lower trolley assemblies 64A permit longitudinal motion of the associated sliding door 12 along the full length of the associated one of the rails 210, 212 or 214 which, as noted previously, extends the full length of the trailer 10. Preferably, and for purposes of convenience, each of the rails 210, 212 and 214 may include pairs of depressions or detents 228 which are spaced apart at a distance equal to the spacing of the axes of rotation of the rollers 226 in the carriages 224. The detents 228 are suitably positioned along the length of each of the rails 210, 212 and 214 in their upper surfaces and indicate by slight detenting action of the rollers 226 and thus of the sliding doors 12, that the door 12 has been properly longitudinally prepositioned such that the steps of pivoting, closing, and latching, delineated above, will be most expeditiously accomplished.

Referring now to FIGS. 2, 16, 17 and 18, it will be appreciated that the upper track assembly 50 is likewise preferably an extrusion which extends along the full length of the trailer 10. As FIGS. 16 and 18 make manifest, rather than utilizing a single extrusion for the upper track assembly 50, it may be preferable to utilize a two piece construction wherein an upper, single extrusion 236 is secured to the remaining structure of the track assembly 50 by suitable fastening means such as rivets. The upper track assembly 50 defines a first, upper channel 240, a second, middle channel 242 and a third, lower channel 244. In a fashion similar to the lower track assembly 52, each of the channels 240, 242 and 244 is dedicated to and utilized by the upper trolley assemblies 64B associated with one of the sliding doors 12. Specifically, the upper channel 240 is utilized by the upper trolley assemblies 64B associated with the forward sliding door 12, the second, middle channel 242 is utilized by the upper trolley assemblies 64B associated with the aft sliding door 12 and the third, lower channel 244 is utilized by the trolley assemblies 64B associated with the middle sliding door 12.

An upper trolley assembly 64B, which is illustrative of all of the upper trolley assemblies 64B, including those associated with the slave pivot arms 202, will now be described. Within each of the channels 240, 242 and 244 and associated with one of the sliding doors 12, as just explained, are disposed carriages 246 which are each pivotally secured to a respective one of the pivot arms 176 or slave pivot arms 202 by a suitable retaining pin 248. The carriage 246 rotatably supports a first pair of rollers 250 positioned on vertically oriented stub shafts 252. The carriage 246 likewise supports a second pair of rollers 256. The second pair of rollers 256 are rotatably disposed upon horizontally oriented stub shafts 258. The first pair of rollers 250 thus engages the sides of the channel 240 whereas the second pair of rollers 256 engages the upper and lower surfaces of the channel 240 thereby permitting smooth, relatively friction free motion of the carriage 246 within the channel 240 and along the length of the trailer 10. Although the weight of each of the sliding doors 12 is carried on the pairs of lower trolley assemblies 64A, the configuration of the upper trolley assemblies 64B ensures smooth longitudinal traverse of the sliding doors 12 in spite of deflection and dimensional change of the position of the upper track assembly 50 and roof 38 of the trailer 10 relative to the lower track assembly 52 due to uneven loading or uneven ground support.

Referring now to FIGS. 19, 20 and 21, the seal assemblies 66A, 66B and 66C provide weather tight seals between adjacent sliding doors 12 and the sliding doors 12 and forward and aft sections of the trailer 10. Such slidably engaged seals occupy a finite longitudinal distance along the trailer 10 thereby compensating for various dimensional changes of the trailer 10 as well as flexing and motion of the sliding doors 12 both during vehicle movement and while stationary due to uneven loading and unstable support conditions.

FIG. 20 illustrates the seal assembly 66B disposed between adjacent sliding doors 12 and since it most simply illustrates the components and function of such assembly, it will be explained first. Basically, the seal assembly 66B includes a formed vertically extending plate 270 which is secured to the sliding door 12 from top to bottom by suitable fasteners (not illustrated). The formed plate 270 cooperatively defines a throat 272 with the outer face of the sliding door 12 which may be protected by a suitable bearing plate 274 secured to the door 12 with the same fasteners utilized to secure the plate 270. Positioned within the throat 272 is a formed tongue 276 which likewise extends from the top to the bottom of the door 12. The tongue 276 includes a first relatively rigid plate having a folded terminal portion 278 defining a U-shaped end. Secured to the tongue 276 and disposed generally parallel to it, is a resilient panel 280 which extends generally back from the terminal portion 278 to the sliding door 12 to which the tongue 276 is secured. Preferably, these components are made of suitably compatible metals such that continual sliding and flexing of the inter-engaged components will not cause deterioration such as spalling and similar deleterious phenomena.

Figure 8:
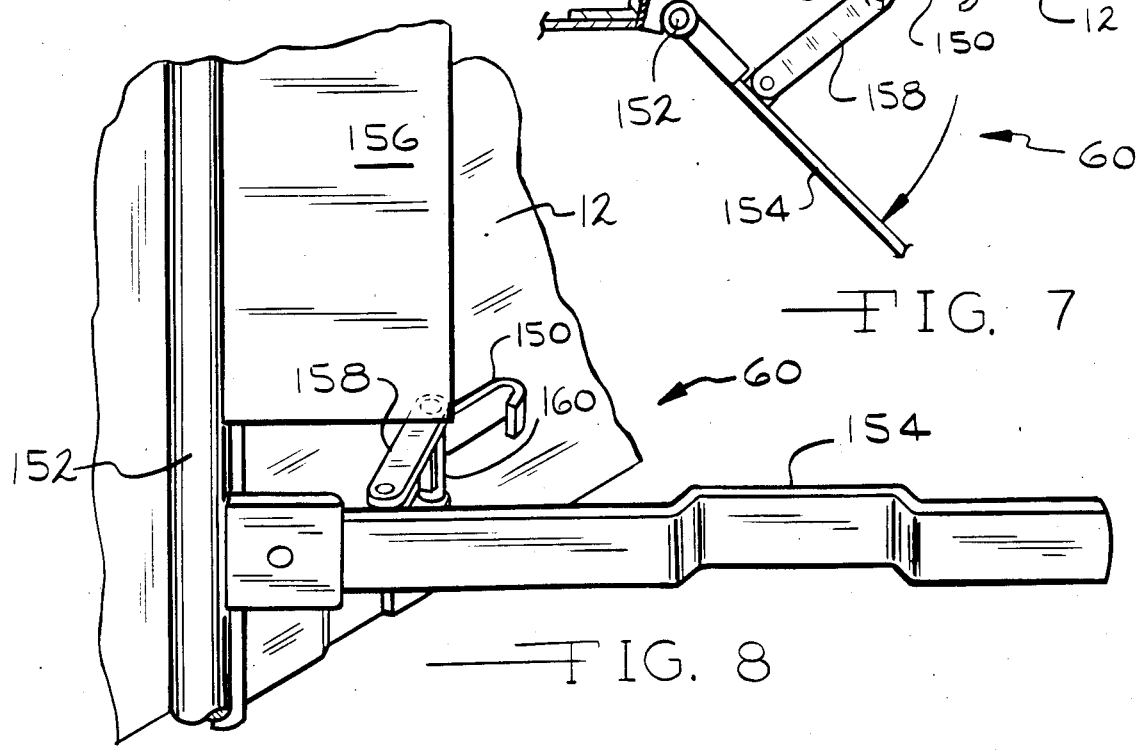
Figure 16:
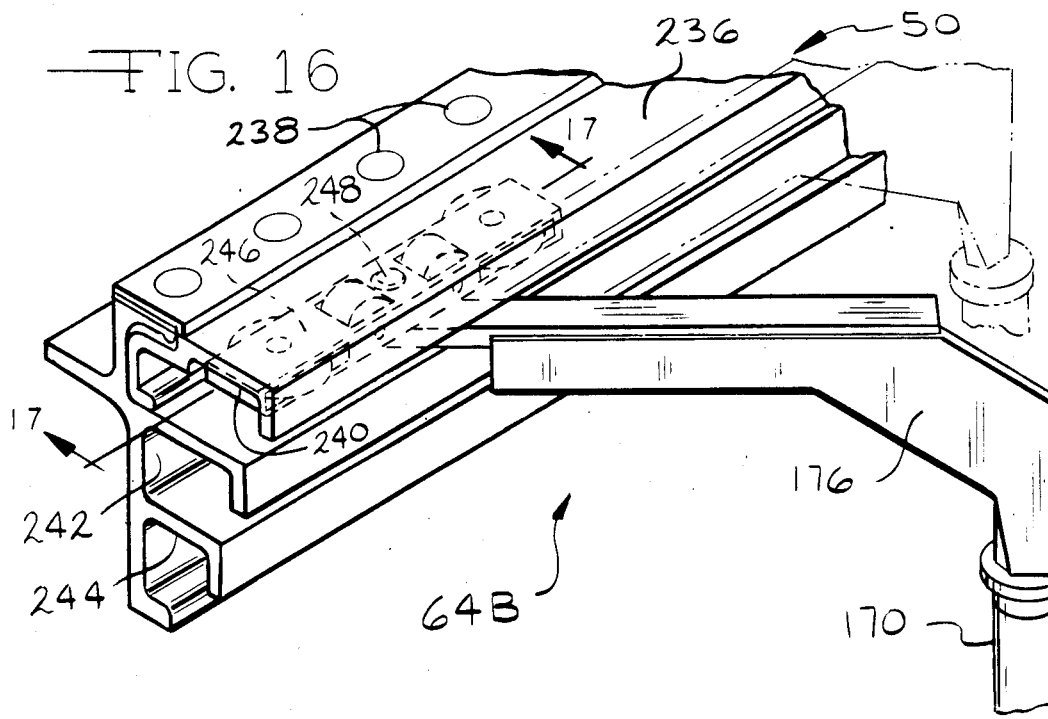
FIG. 16 is a fragmentary, perspective view of the upper track assembly and one of the upper trolley assemblies associated with the forward door.
Figure 17:
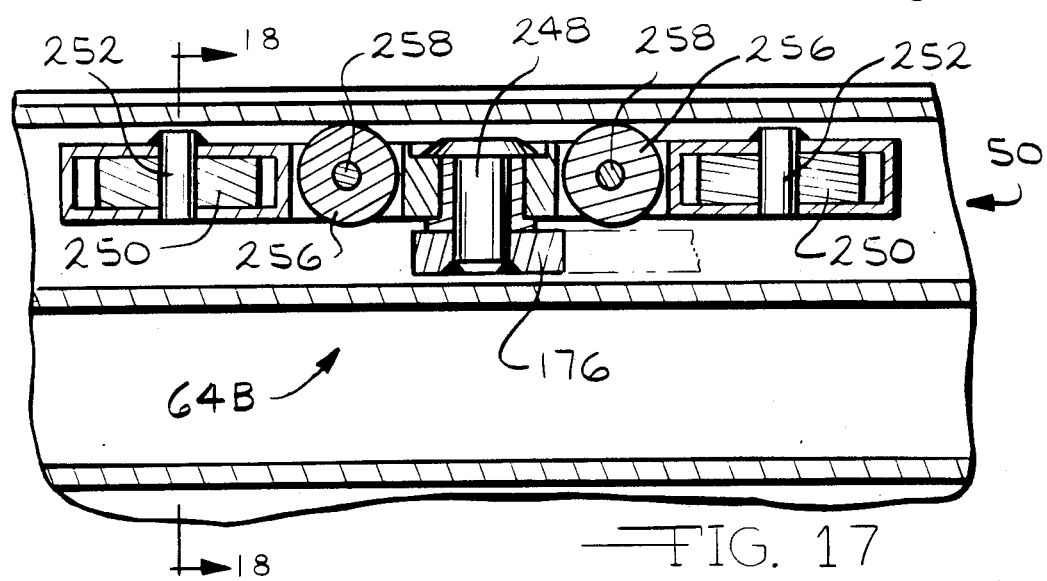
FIG. 17 is a fragmentary, sectional view of the upper trolley assembly illustrated in FIG. 16, taken along line 17—17 of FIG. 16.
Figure 18:
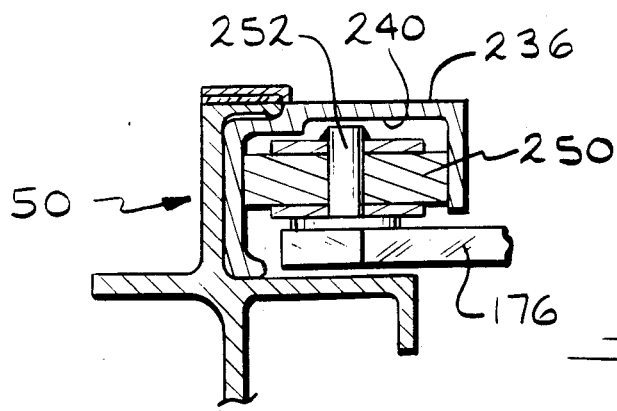
FIG. 18 is a fragmentary, sectional view of the trolley assembly illustrated in FIG. 17, taken along line 18—18 of FIG. 17.

In FIG. 19, which illustrates the aft sliding door 12 and a portion of one of the rear doors 42, it will be appreciated that a throat 282, which is functionally equivalent to the throat 272 of the seal assembly 66B illustrated in FIG. 20, is created between a vertically oriented plate 284 and the pivoted seal plate 156 illustrated in FIGS. 6 and 8. Similarly, a tongue 286 is secured to the aft sliding door 12 and includes a folded terminal portion 288 and a resilient panel 290 secured to the tongue 276 generally adjacent the terminal portion 288 and extending toward the sliding door 12. The analogous nature of the elements above denominated numbers 282 through 290 to those respectively denominated 272 through 280 should be apparent and it is therefore believed unnecessary to additionally explain their function and interrelationship. At the forward portion of the trailer 10 where the forward sliding door 12 abuts the front wall 34 of the trailer, the components of the seal assembly 66C are in all respects the same as those relating to the sealing assembly 66A disposed between the aft sliding door 12 and the rear of the trailer, illustrated in FIG. 19. That is, the sealing assembly 66C illustrated in FIG. 21 includes a throat 282 which is defined by the seal plate 156 and a plate 284. The tongue 286 is likewise folded to define a terminal portion 288 and includes a resilient panel 290 secured thereto. It will be appreciated that in construction and function, the just described seal assembly 66, illustrated in FIG. 21, is in all respects similar to that seal assembly 66A illustrated in FIG. 19.

The foregoing disclosure is the best mode devised by the inventor for practicing this invention. It is apparent, however, that apparatus incorporating modifications and variations will be obvious to one skilled in the art of cargo transportation devices. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claim.

I claim:

1. In a cargo vehicle having a floor, a front and rear wall, a roof and two opposing side walls the improvement therein at least one of said side walls comprises a multiplicity of wall panels (12), said wall panels slidingly attached to an upper (50) and lower side rail (52), said upper and lower side rails (50; 52) being in juxtaposition to said roof (38) and said floor (32) respectively, said upper side rail (50) including a multiplicity of "L" shaped legs (240; 242; 244), one for each of said wall panels (12), each of said "L" shaped legs (240; 242; 244) extending outward from and forming a downward opening channel in concert with said upper side rail (50), shuttle means (64B) in sliding engagement with each of said downward opening channels (240; 242; 244), said shuttle means (64B) including at least one roller (256) rotatable about a laterally extending axial shaft (258) and rollingly engaging an underside of a respective one of said "L" shaped legs (240; 242; 244), said lower side rail (52) including a multiplicity of wall panel supporting rails (210; 212; 214), one rail for each of said wall panels (12), said supporting rails (210; 212; 214) extending outward from and longitudinally parallel to said lower side rail (52), trolley means (64A) slidingly engaging each of said wall supporting rails (210; 212; 214), corresponding pivot arms (176) pivotly attached to each corresponding pair of shuttle means (64B) and trolley means (64A), an operator rod (170) extending and affixed to each pair of corresponding pivot arms (176), means (172) for attaching said wall panel (12) to said operator rods (170) whereby rotation of said pivot arms (176) causes said wall panel (12) to translate laterally outward from said upper and lower side rails (64A; 64B) thereby permittting longitudinal translation of said wall panel (12).

* * * * *